(12) United States Patent
Shimada et al.

(10) Patent No.: US 12,298,913 B2
(45) Date of Patent: May 13, 2025

(54) STORAGE SYSTEM

(71) Applicant: Hitachi, Ltd., Tokyo (JP)

(72) Inventors: Kentaro Shimada, Tokyo (JP); Nobuhiro Yokoi, Tokyo (JP); Masahiro Tsuruya, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 56 days.

(21) Appl. No.: 18/178,953

(22) Filed: Mar. 6, 2023

(65) Prior Publication Data
US 2024/0054076 A1 Feb. 15, 2024

(30) Foreign Application Priority Data
Aug. 12, 2022 (JP) .................. 2022-128905

(51) Int. Cl.
*G06F 12/10* (2016.01)
(52) U.S. Cl.
CPC .................. *G06F 12/10* (2013.01)
(58) Field of Classification Search
CPC ....................................... G06F 12/10
See application file for complete search history.

(56) References Cited

U.S. PATENT DOCUMENTS

| 8,423,677 B2 | 4/2013 | Nakamura et al. |
| 8,700,856 B2 | 4/2014 | Tanaka et al. |
| 2020/0133764 A1* | 4/2020 | Li ..................... G06F 3/0619 |

* cited by examiner

*Primary Examiner* — Gary W. Cygiel
(74) *Attorney, Agent, or Firm* — Volpe Koenig

(57) ABSTRACT

A protocol chip writes a request from a host apparatus to a shared memory. One of the plurality of processors reads the request from the host apparatus from the shared memory through an address translation unit and writes a response to the request to the shared memory through the address translation unit. The protocol chip reads the response from the shared memory and sends the response to the host apparatus. In the case where a first processor reboots, the first processor performs a reboot process of a first address translation unit but does not perform the reboot process of the shared memory. A second processor reads a first request addressed to the first processor from the host apparatus through a second address translation unit and writes a first response to the first request to the shared memory through the second address translation unit.

8 Claims, 12 Drawing Sheets

PROCESSOR UNIT

STORAGE SYSTEM

CLAIM OF PRIORITY

The present application claims priority from Japanese patent application JP2022-128905 filed on Aug. 12, 2022, the content of which is hereby incorporated by reference into this application.

BACKGROUND OF THE INVENTION

1. Field of the Invention

The present disclosure relates to a configuration of a storage system that includes a protocol chip.

2. Description of the Related Art

In a storage system, a plurality of storage controllers for controlling the system are provided to improve reliability, which makes it possible, even if any of the storage controllers becomes faulty, to continue operation with the remaining storage controller or controllers. The typical number of such storage controllers is two. For example, U.S. Pat. No. 8,700,856 discloses an example in which a controller section of a storage system includes two controllers.

In such a storage system, there is a case where it is necessary to reboot a central processing unit (CPU) of the controller due to operating system (OS) update in addition to a fault. The storage system performs input/output (IO) communication to input data from and output data to a host apparatus. Fibre Channel is, for example, used as a protocol for this communication with the host apparatus.

If the CPU reboots under such a circumstance, the IO communication with the host apparatus controlled by the CPU in question is forced to be temporarily disrupted. From the viewpoint of the host apparatus, it looks as if the storage system has temporarily gone down. In order to avoid this, it is necessary to switch the IO communication to be performed with a controller whose CPU has not rebooted. However, this requires setting changes and re-execution of applications, for example, on the side of the host apparatus. Accordingly, there is a demand for a configuration that prevents disruption of IO communication with the host apparatus even if the CPU reboots.

In order to solve this problem, it is conceivable to have a mechanism for automatically switching IO communication with the host apparatus on the side of the storage controllers. U.S. Pat. No. 8,423,677 discloses an example of a storage system that includes a local router having a function capable of automatically switching IO communication when the CPU reboots, by automatically distributing access destinations of the protocol chip for controlling the protocol of IO communication with the host apparatus.

However, because such a local router requires complicated control, there can be a case where it is controlled by some software executed some kind of CPU installed in the local router. In that case, it becomes necessary to reboot the local router when the OS of the local router itself is updated. Also, there is a case where the local router itself becomes faulty. In such a case, the local router's function for automatically switching IO communication with the host apparatus cannot be used, as a result of which IO communication with the host apparatus is disrupted.

SUMMARY OF THE INVENTION

The problem to be solved by the present disclosure is to avoid disruption of IO communication with a host apparatus without including a special control function unit such as a local router even in the case where a processor reboots due to OS update or the like.

A storage system according to an aspect of the present disclosure includes a plurality of protocol chips, a plurality of processors, a plurality of shared memories, and a plurality of address translation units. The protocol chips control a protocol used for communication with a host apparatus. The plurality of processors control the storage system. The shared memories can be read and written by the plurality of protocol chips and the plurality of processors. Each of the plurality of address translation units connects the corresponding processor of the plurality of processors and the plurality of shared memories. The address translation units translate addresses used by the respective corresponding processors of the plurality of processors into addresses used to read from or write to the shared memory. The protocol chip writes a request from a host apparatus to the shared memory. One of the plurality of processors reads the request from the host apparatus written in the shared memory by the protocol chip from the shared memory through the address translation unit connected to the processor and writes a response to the request to the shared memory through the address translation unit. The protocol chip reads the response to the request from the host apparatus written by the processor from the shared memory and sends the response to the host apparatus. In a case where a first processor of the plurality of processors reboots, the first processor performs a reboot process of a first address translation unit connected to the first processor but does not perform the reboot process of the shared memory. The shared memory continues to operate, and a second processor that is different from the first processor of the plurality of processors substitutes for the first processor, reads a first request addressed to the first processor from the host apparatus written by the protocol chip from the shared memory through a second address translation unit connected to the second processor, and writes a first response to the first request to the shared memory through the second address translation unit.

As a result, disruption of IO communication with a host apparatus is avoided even in the case where a processor reboots.

DESCRIPTION OF THE PREFERRED EMBODIMENTS

Embodiment 1

Figure 1:
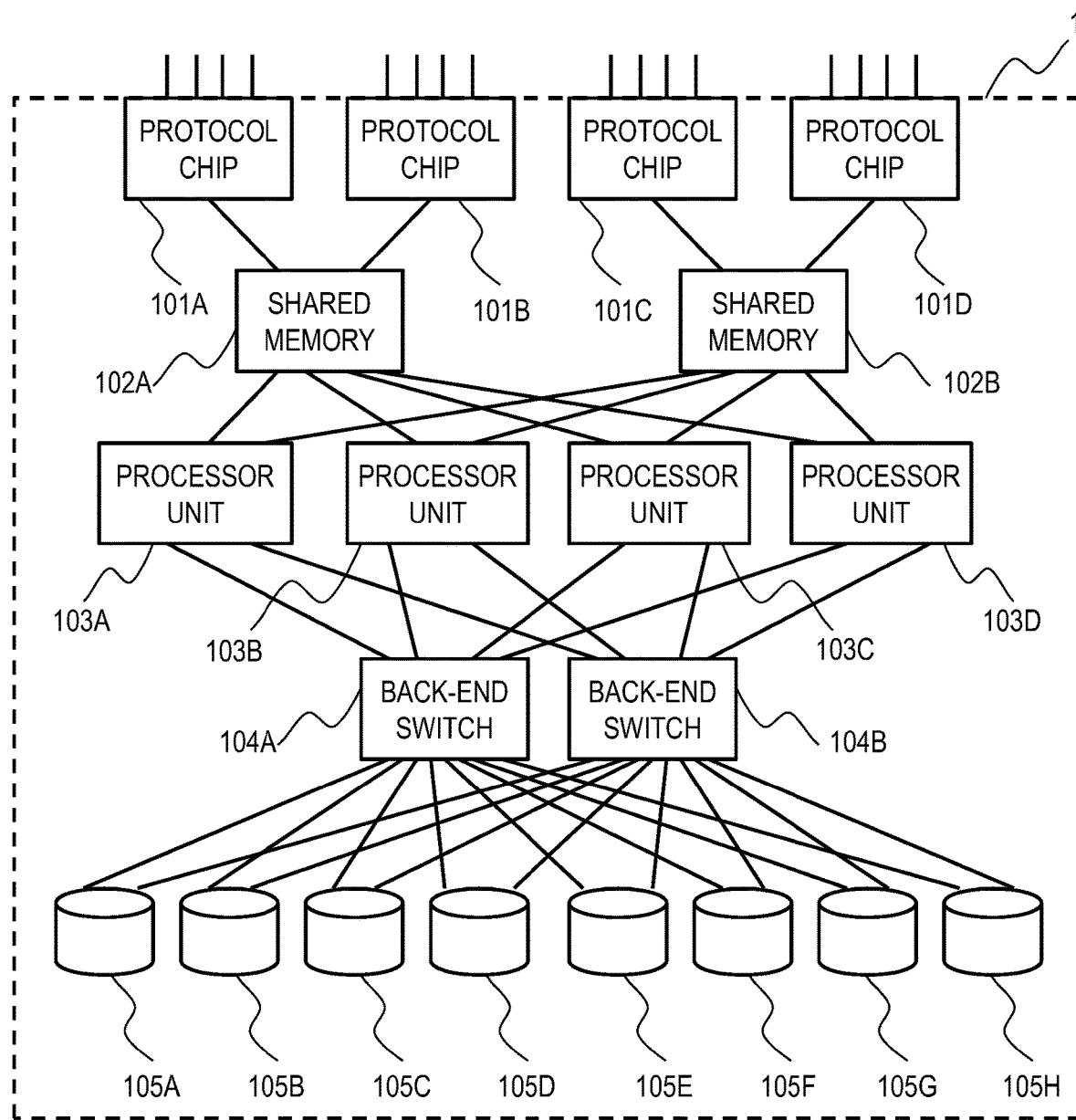
FIG. 1 is an example of a first configuration of a storage system.

A description will be given of embodiment 1 by using FIGS. 1 to 5. FIG. 1 is an example of a configuration of a storage system according to embodiment 1. In FIG. 1, a storage system 1 according to embodiment 1 includes four protocol chips 101A to 101D, two shared memories 102A and 1026, four processor units 103A to 103D, two back-end switches 104A and 104B, and eight storage devices 105A to 105H.

The protocol chips 101A to 101D are connected to an unillustrated host apparatus and controls a protocol used for communication with the host apparatus. The protocol chips 101A to 101D perform conversion between the communication protocol used with the host apparatus and the communication protocol used inside the storage system 1. Although FIG. 1 illustrates the four protocol chips 101A to 101D, the number thereof is not limited to four and can be any number greater than or equal to one.

Similarly, although FIG. 1 illustrates the two shared memories 102A and 102B, the number thereof is not limited to two and can be any number greater than or equal to one. Further, although FIG. 1 illustrates the two back-end switches 104A and 104B, the number thereof is not limited to two and can be any number greater than or equal to one.

The eight storage devices 105A to 105H provide a function to store data in the storage system 1. A typical example of the storage devices 105A to 105H is a non-volatile semiconductor device such as a solid stated drive (SSD) having a flash memory or flash memories in its storage section. Another typical example of the storage devices 105A to 105H is a hard disk drive (HDD) for recording data on a magnetic disk. Although FIG. 1 illustrates the eight storage devices 105A to 105H, the number thereof is not limited to eight and can be any number greater than or equal to one.

When such a request as data read or write is received from the host apparatus (not illustrated) that is connected to the protocol chips 101A or 101B, the protocol chips 101A or 101B stores the host request in the predetermined areas inside the shared memory 102A. Also, the processor units 103A to 103D store a response to the host request received via the protocol chip 101A or 101B in the predetermined areas inside the shared memory 102A.

Figure 2:
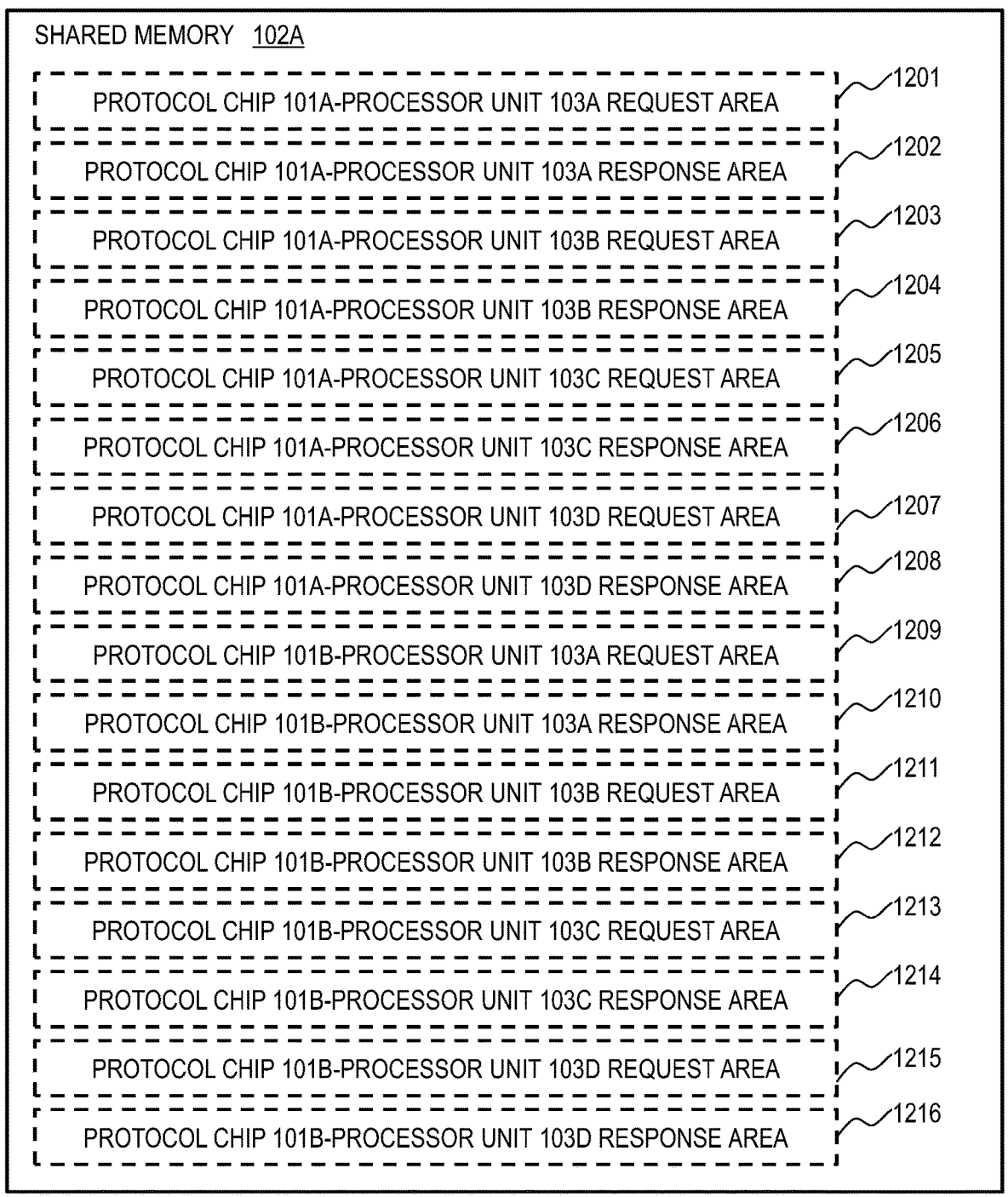
FIG. 2 is an example of an area provided for each combination of a protocol chip and a processor unit inside a shared memory in embodiment 1.

FIG. 2 illustrates a configuration example of areas for storing a host request and areas for storing a response to the host request inside the shared memory 102A. The shared memory 102A includes the areas for communication between the protocol chip 101A and the respective processor units and the areas for communication between the protocol chip 101B and the respective processor units. These areas are, for example, queuing areas.

Specifically, the shared memory 102A includes an area 1201 for storing a host request from the protocol chip 101A to the processor unit 103A and an area 1202 for storing a response from the processor unit 103A to the protocol chip 101A. Similarly, the shared memory 102A includes an area 1203 for storing a host request and an area 1204 for storing a response for communication between the protocol chip 101A and the processor unit 103B.

Further, the shared memory 102A includes an area 1205 for storing a host request and an area 1206 for storing a response for communication between the protocol chip 101A and the processor unit 103C. Also, the shared memory 102A includes an area 1207 for storing a host request and an area 1208 for storing a response for communication between the protocol chip 101A and the processor unit 103D.

Further, the shared memory 102A includes an area 1209 for storing a host request from the protocol chip 101B to the processor unit 103A and an area 1210 for storing a response from the processor unit 103A to the protocol chip 101B. Similarly, the shared memory 102A includes an area 1211 for storing a host request and an area 1212 for storing a response for communication between the protocol chip 101B and the processor unit 103B.

Further, the shared memory 102A includes an area 1213 for storing a host request and an area 1214 for storing a response for communication between the protocol chip 101B and the processor unit 103C. Also, the shared memory 102A includes an area 1215 for storing a host request and an area 1216 for storing a response for communication between the protocol chip 101B and the processor unit 103D.

When such a request as data read or write is received from the host apparatus (not illustrated) that is connected to the protocol chip 101C or 101D, the protocol chip 101C or 101D stores the host request in the predetermined areas inside the shared memory 102B. Also, the processor units 103A to 103D store a response to the host request received via the protocol chip 101C or 101D in the predetermined areas inside the shared memory 102B. Also, the processor units 103A to 103D store a response to the host request received via the protocol chip 101C or 101D in the predetermined areas inside the shared memory 102B.

The shared memory 102B includes areas for communication between the protocol chip 101C and each of the processor units and areas for communication between the protocol chip 101D and each of the processor units. In the same way as illustrated in FIG. 2, the areas for storing a host request and the areas for storing a response are allocated for each combination of the protocol chip and the processor unit.

Figure 3:
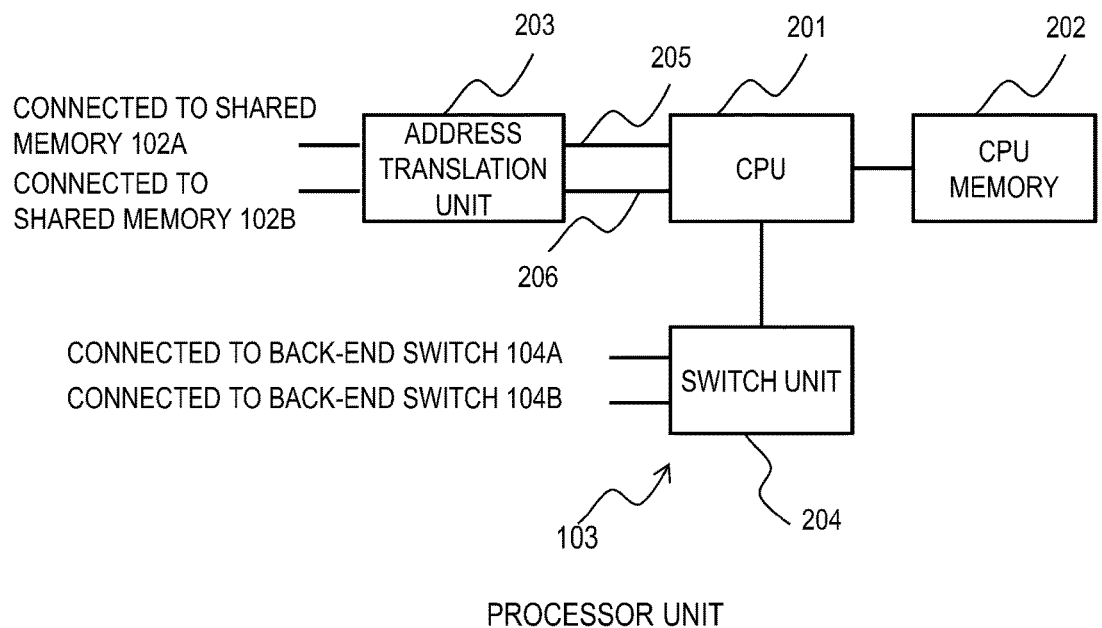
FIG. 3 is an example of a configuration of the processor unit in embodiment 1.

FIG. 3 illustrates a configuration example of the processor unit 103. The processor unit 103 represents any one of the four processor units 103A to 103D. In this embodiment, the processor units 103A to 103D have the configuration illustrated in FIG. 3. The processor unit 103 includes a CPU 201 that is an example of a processor, a CPU memory 202, an address translation unit 203, and a switch unit 204. It should be noted that a processor different in type from a CPU may be implemented.

The CPU memory 202 stores data for operating the CPU 201 and data referenced by the CPU 201. The CPU memory 202 is accessed only by the CPU 201. Address translation (address mapping) between different address spaces is performed by the address translation unit 203. A signal line 205 is a shared memory read/write signal line for accessing the shared memories 102A and 102B. A signal line 206 is a reset signal line for transferring a reset signal from the CPU 201.

The switch unit 204 includes ports connected to the respective back-end switches 104A and 104B. The switch unit 204 performs switching for transferring data between the back-end switches 104A and 1046 and the CPU 201.

Figure 4:
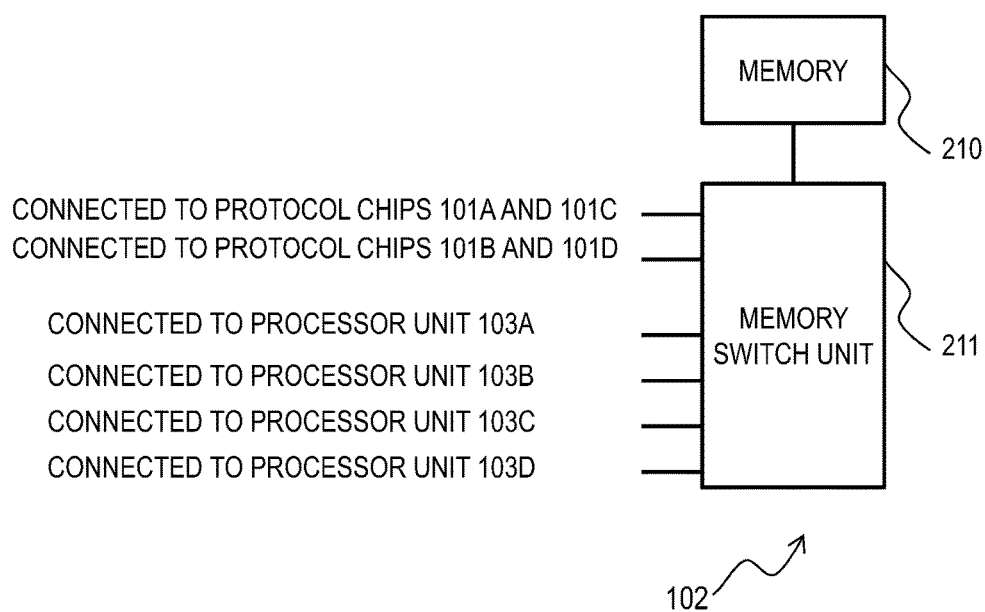
FIG. 4 is an example of a configuration of the shared memory in embodiment 1.

FIG. 4 illustrates a configuration example of the shared memory 102. The shared memory 102 illustrates any one of the two shared memories 102A and 102B. In this embodiment, the shared memories 102A and 1026 have a configuration illustrated in FIG. 4.

The shared memory 102 includes a memory 210 and a memory switch unit 211. The memory 210 is a storage medium for providing a storage area and is, for example, a dynamic random access memory (DRAM). The memory switch unit 211 includes ports connected to the memory 210, the protocol chips 101A to 101D, and the processor units 103A to 103D. The memory switch unit 211 switches paths for accessing the memory 210.

Figure 5:
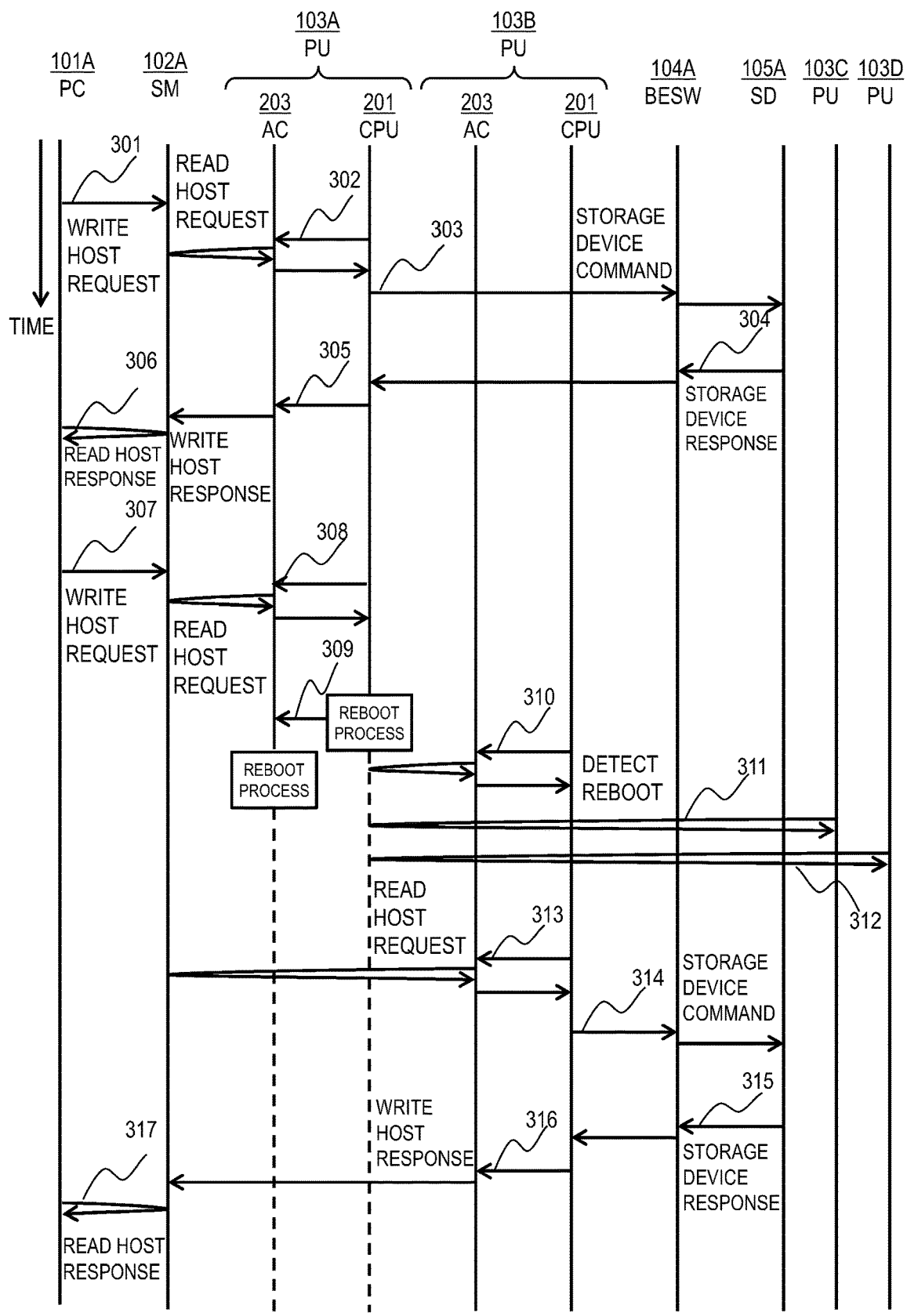
FIG. 5 is an example of a processing sequence for taking over a request and a response from a host apparatus in embodiment 1.

FIG. 5 is a sequence diagram of an operation example of the storage system 1. In the operation example of FIG. 5, the protocol chip (PC) 101A receives a host request from the host apparatus, and the processor unit (PU) 103A starts to process the host request. Then the processor unit 103A starts to reboot in the middle of processing the host request. The processing of the host request that had been performed by the processor unit 103A is taken over by the processor unit 103B.

Described with reference to FIG. 5, the protocol chip 101A writes the host request received from the host apparatus to the protocol chip 101A-processor unit 103A request area 1201 in the shared memory (SM) 102A (301). The host request is, for example, a data read request or write request.

The CPU 201 of the processor unit 103A reads the request written to the protocol chip 101A-processor unit 103A request area 1201, by way of the address translation unit 203 thereof (302). More specifically, the CPU 201 instructs the address translation unit 203 to read from the shared memory 102A through the shared memory read/write signal line 205 and acquires a read result similarly through the shared memory read/write signal line 205. The address translation unit 203 performs necessary address translation, reads the host request from the shared memory 102A, and sends the request to the CPU 201.

Because the shared memory 102A is accessed by the CPU 201 of the processor unit 103A, the CPU 201 of the processor unit 103B, the protocol chip 101A, and the protocol chip 101B, the shared memory 102A is given a unique address that can be used to be accessed by all of the CPU 201 of the processor unit 103A, the CPU 201 of the processor unit 103B, the protocol chip 101A, and the protocol chip 101B in common.

In contrast, the CPU 201 of the processor unit 103A and the CPU 201 of the processor unit 103B may have dedicated addresses to access the respective CPU memories 202 thereof. In such a case, it is necessary to perform address translation between the dedicated address of each of the CPUs 201 of the processor units 103A and 103B and the unique address given to the shared memory 102A.

The address translation performed in the address translation unit 203 realizes this process, and when the CPU 201 of the processor unit 103A attempts to access the shared memory 102A, for example, the address translation unit 203 of the processor unit 103A converts the dedicated address of the CPU 201 of the processor unit 103A output from the CPU 201 of the processor unit 103A through the signal line 205 into the unique address given to the shared memory 102A and conveys the address to the shared memory 102A.

The CPU 201 of the processor unit 103A issues a command to the target storage device (SD) 105A via the back-end switch (BESW) 104A (303), and receives a response thereto via the back-end switch 104A (304).

The CPU 201 of the processor unit 103A instructs the address translation unit 203 to write a response to the protocol chip 101A-processor unit 103A response area 1202 in the shared memory 102A. The address translation unit 203 performs necessary address translation and writes a host response to the protocol chip 101A-processor unit 103A response area 1202 (305). The protocol chip 101A reads the host response from the protocol chip 101A-processor unit 103A response area 1202 and returns the host response to the host apparatus (306).

As described above, a host response to a host request from the host apparatus is returned to the host apparatus. A description will be given below of an example in which the processor unit 103A performs a reboot process.

The protocol chip 101A writes a host request received from the host apparatus to the protocol chip 101A-processor unit 103A request area 1201 in the shared memory 102A (307).

The CPU 201 of the processor unit 103A reads the request written to the protocol chip 101A-processor unit 103A request area 1201 by way of the address translation unit 203 thereof (308).

Here, the processor unit 103A starts a reboot process 309. In the case where the processor unit 103A reboots, the CPU 201 of the processor unit 103A performs the reboot process. At this time, a reset signal is sent to the address translation unit 203 of the processor unit 103A through the reset signal line 206 to cause the address translation unit 203 to perform the reboot process such as stopping address translation operation. It should be noted, however, that the CPU 201 of the processor unit 103A does not send a reset signal to the shared memory 102A at this time and that the shared memory 102A continues to operate while at the same time maintaining its status (retaining data).

In the example of FIG. 5, the processor unit 103B detects a reboot of the processor unit 103A and takes over an IO process thereof. Inside the storage system 1, the processor units 103A to 103D monitor each other's operation, for example, particularly via the memory switch units 211 of the shared memories 102A and 102B. The processor unit that starts a reboot records, for example, information indicating such start of a reboot in the request area and/or the response area in the shared memories 102A and 102B. Alternatively, the processor units 103A to 103D may monitor each other's operation by acquiring, through the memory switch units 211, a signal indicating whether or not other processor units reboot or a heartbeat signal indicating that other processor units are operating normally without any reboot.

The first processor unit that detected the reboot takes over the IO process of the processing unit that has started to reboot. The fact of taking over the process is recorded, for example, in the request area and/or the response area of the processor unit that is rebooting, in the shared memories 102A and 102B. This makes it possible for other processor units to know which two processor units engaged in the takeover. It should be noted that a heartbeat signal may be used to monitor operation. Instead of each of other processor units detecting a reboot of one processor unit, the processor unit that has detected a reboot may notify other processor units of the reboot.

It should be noted that the first processor unit that detected a reboot is not required to always take over the IO process. In that case, the first processor unit that detected a reboot may determine which processor unit takes over the IO process of the processor unit 103A that reboots, by performing an arbitration process with other processor units. Also, among the processor units, the one or plurality of predetermined processor units may determine which processor unit takes over the IO process. Further, there may be provided a takeover processor unit determination unit other than the processor units that determines which processor unit takes over the IO process. The first, second, or subsequent processor unit that detected a reboot notifies the processor unit that determines which processor unit takes over the IO process, or the takeover processor unit determination unit, of the detection of a reboot and makes the processor unit or the takeover processor unit determination unit determine the processor unit that takes over the IO process.

The CPU 201 of the processor unit 103B detects a reboot of the processor unit 103A via the address translation unit 203 of the processor unit 103B in the example illustrated in FIG. 5 (310). In such a case, the address translation unit 203 of the processor unit 103B may include a dedicated signal line or a dedicated function for monitoring the CPU 201 of the processor unit 103A. Similarly, the processor units 103C and 103D detect a reboot of the processor unit 103A (311 and 312). The processor unit 103B detects the reboot of the processor unit 103A first and takes over the IO process thereof.

The CPU 201 of the processor unit 103B reads the host request from the protocol chip 101A-processor unit 103A request area 1201 via the address translation unit 203 of the processor unit 103B (313).

The CPU 201 of the processor unit 103B issues a command to the target storage device 105A (SD) via the back-end switch (BESW) 104A (314), and receives a response thereto via the back-end switch 104A (315).

The CPU 201 of the processor unit 103B instructs the address translation unit 203 to write the response to the protocol chip 101A-processor unit 103A response area 1202 in the shared memory 102A. The address translation unit 203 performs necessary address translation and writes the host response to the protocol chip 101A-processor unit 103A response area 1202 (316). The protocol chip 101A reads the host response from the protocol chip 101A-processor unit 103A response area 1202 and returns the host response to the host apparatus (317).

As described above, in the case where a processor unit reboots due to OS update or the like, information is not cleared from the shared memory, and the protocol chip is not reset. Even if the processor unit reboots, the shared memory continues to operate while at the same time maintaining its status (retaining data), which makes it possible for a different processor unit to take over the IO process via the shared memory and disruption of IO communication with the host apparatus can be avoided without including a special control function unit such as a local router.

It should be noted that an amount of time to be taken from suspension of normal operation and start of the reboot process to completion of the reboot process in the case where the processor unit is to reboot can be set freely. For example, the processor unit 103A may not complete the reboot process. That is, the processor unit 103A may suspend normal operation due to a fault rather than performing a reboot. Even in such a case, the processor unit 1036 can take over the IO process of the processor unit 103A. Accordingly, for example, in the case where the processor unit 103A becomes faulty such that it cannot reboot, the reboot process may be completed after the processor unit 103A is replaced or repaired such that it can normally reboot.

Embodiment 2

Figure 6:
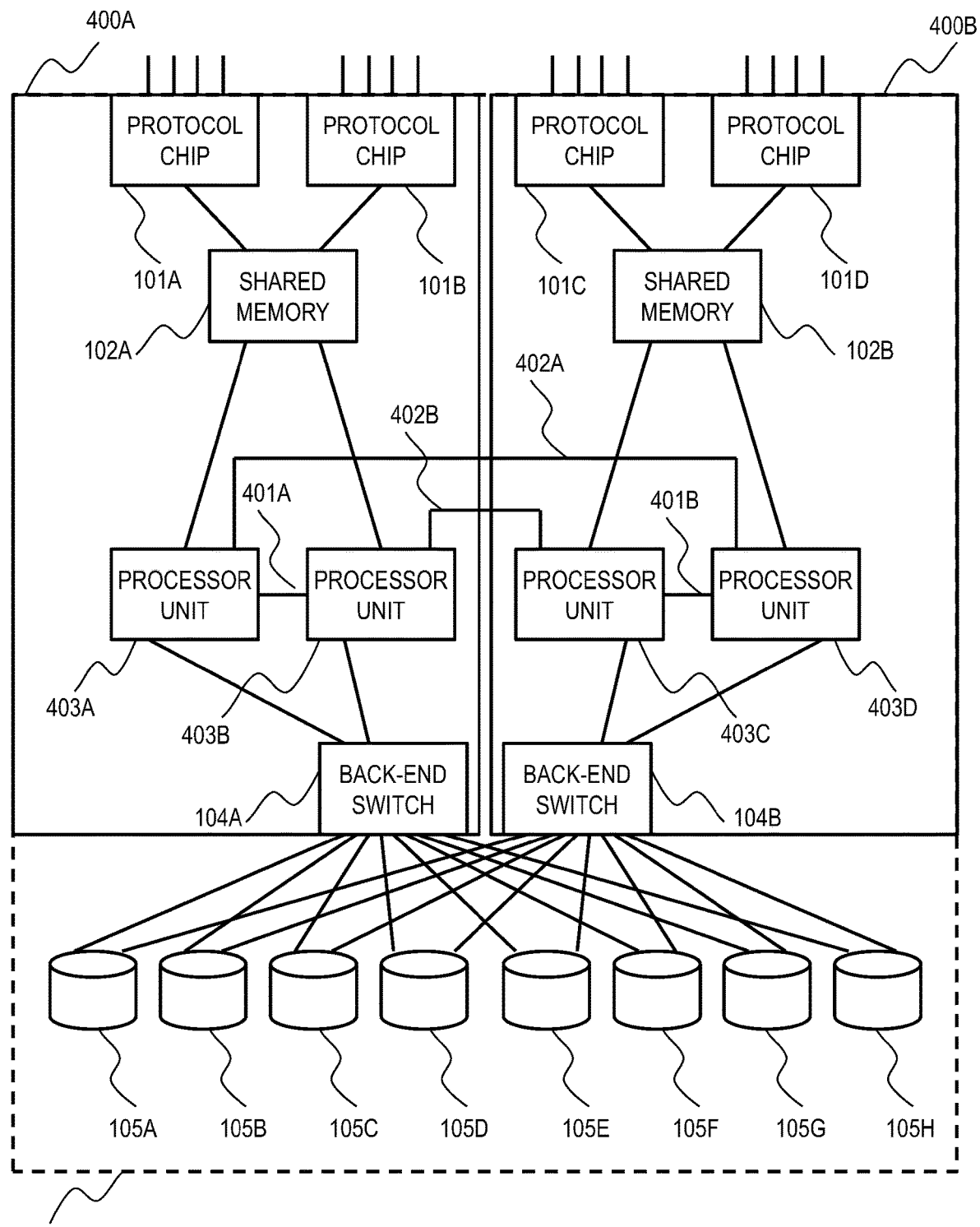
FIG. 6 is an example of a configuration of a storage system in embodiment 2.

A description will be given below of a storage system of embodiment 2. In the following description, focus will be placed on differences from embodiment 1. FIG. 6 is an example of a configuration of the storage system in embodiment 2. The storage system 1 includes storage controllers 400A and 400B. Although FIG. 6 illustrates two storage controllers as an example, the number thereof can be any number greater than or equal to two.

Each of the storage controllers 400A and 400B processes IO requests from the host apparatus. The host apparatus can access the storage devices 105A to 105H by way of any of the storage controllers 400A and 400B.

The storage controller 400A includes the protocol chips 101A and 1016, the shared memory 102A, processor units 403A and 403B, and the back-end switch 104A. The storage controller 400B includes the protocol chips 101C and 101D, the shared memory 102B, processor units 403C and 403D, and the back-end switch 104B.

In the configuration example illustrated in FIG. 6, the storage controllers 400A and 400B have the same numbers of protocol chips, shared memories, processor units, and back-end switches. This makes it possible for the storage controllers 400A and 400B to exhibit similar performance. It should be noted that the number of components of each type of the storage controllers 400A and 400B is not limited to those illustrated. The implementation of the plurality of storage controllers makes it possible to take over each other when any one of them becomes faulty and thereby enhance availability.

Also, the implementation for allowing replacement on a storage-controller-by-storage-controller basis becomes easier, and fault recovery is facilitated by quick replacement of the controller at the time of a fault. Further, performance of the respective storage controllers to process IO requests from the host apparatus can be equalized by providing the same numbers of protocol chips, shared memories, processor units, and back-end switches, which eliminates the need to take into consideration a difference in processing performance between storage controllers in the case where distribution of processing among the respective storage controllers is determined and makes it easy to determine the distribution.

A path 401A connects the processor unit 403A and the processor unit 403B and transfers data therebetween. A path 402A connects the processor unit 403A and the processor unit 403D and transfers data therebetween. A path 401B connects the processor unit 403C and the processor unit 403D and transfers data therebetween. A path 402B connects the processor unit 403B and the processor unit 403C and transfers data therebetween.

As a result, the paths 402A and 402B become the only paths that connect the storage controllers 400A and 400B, and while the processor units 403A and 403C and the processor units 403B and 403D are not directly connected, path connection is simplified. This makes it possible to simplify a procedure for replacing the storage controllers 400A and 400B. Also, it becomes possible for the processor units 403A and 403D and the processor units 403B and 403C to monitor each other's operation by connecting the processor units 403A and 403D and the processor units 403B and 403C with the paths 402A and 402B, respectively, which makes it possible to detect faults of the processor units 403A and 403B or the processor units 403C and 403D when both processor units in each pair become faulty.

The shared memory 102A is accessed by the protocol chips 101A and 101B and the processor units 403A and 403B but not by the protocol chips 101C and 101D and the processor units 403C and 403D of the storage controller 400B.

The shared memory 102B is accessed by the protocol chips 101C and 101D and the processor units 403C and 403D but not by the protocol chips 101A and 101B and the processor units 403A and 403B of the storage controller 400A.

The processor units 403A and 403B access the storage devices 105A to 105H via the back-end switch 104A. The processor units 403C and 403D access the storage devices 105A to 105H via the back-end switch 104B.

When a processor unit starts to reboot, the other processor unit in the same storage controller takes over the IO process thereof. As in embodiment 1, even if the processor unit reboots, the status of the shared memory (data) is maintained, and the shared memory continues to operate. Accordingly, the other processor unit can take over the IO process of the processor unit that has started to reboot.

As for the processor units of different storage controllers, because they cannot access the shared memory 102A or 102b of the other processor unit, the IO process itself is not taken over. It should be noted, however, that because the storage controllers 400A and 400B are connected by the paths 402A and 402B in the example illustrated in FIG. 6, the storage controllers 400A and 400B can communicate data, received from the host apparatus through the path 402A or 402B, with each other. Moreover, by storing the data received through communication with the other storage controller within the storage controller, a risk of loss of the data received from the host apparatus before storing the data in the storage devices 105A to 105H can be reduced even if the storage controller 400A or 400B becomes faulty.

Figure 7:
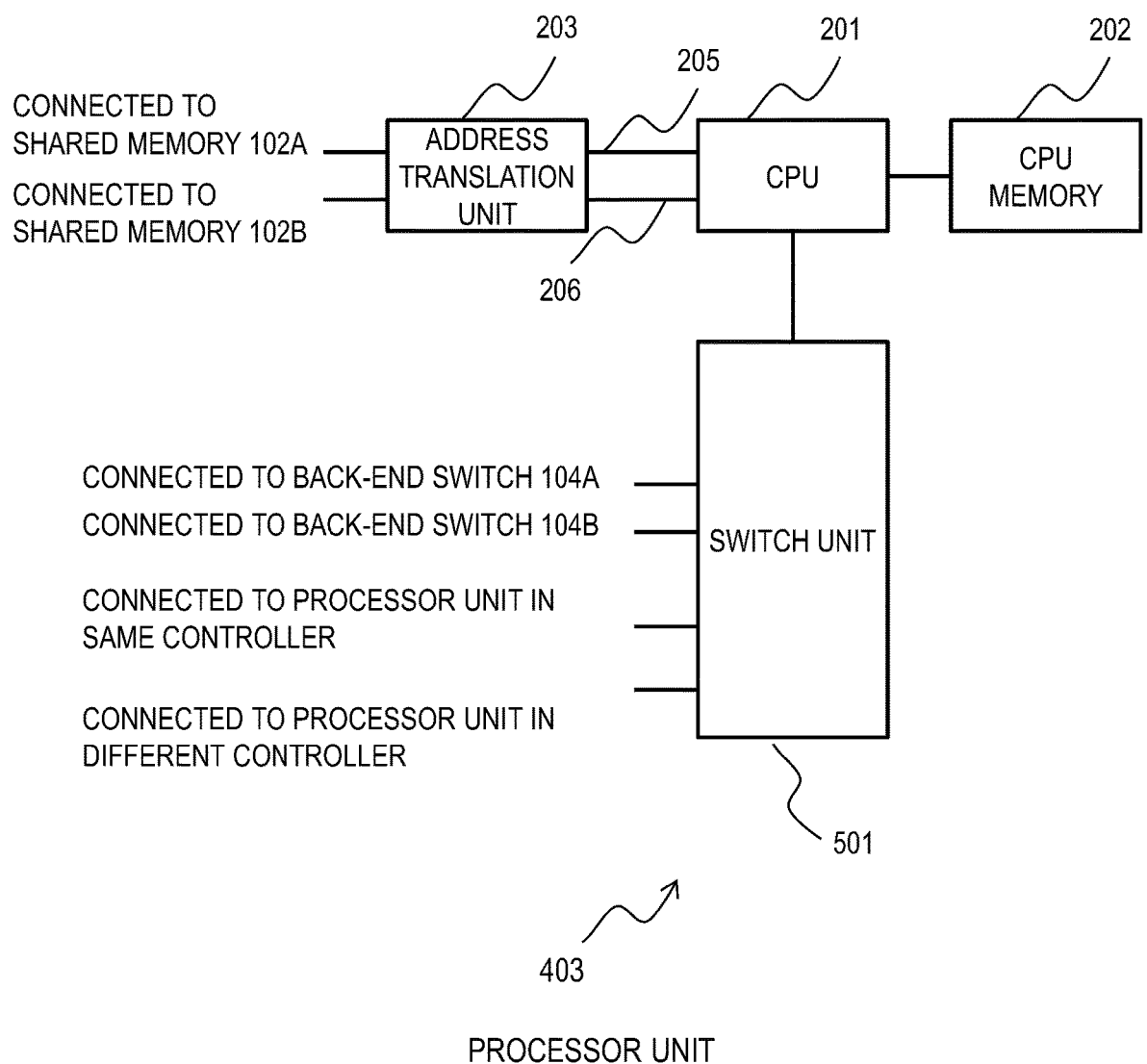
FIG. 7 is an example of a configuration of the processor unit in embodiment 2.

FIG. 7 illustrates a configuration example of the processor unit 403 in embodiment 2. The processor unit 403 represents any one of the four processor units 403A to 403D. In this embodiment, the processor units 403A to 403D have the configuration illustrated in FIG. 7. The processor unit 403 includes the CPU 201, the CPU memory 202, the address translation unit 203, and a switch unit 501. The CPU 201, the CPU memory 202, and the address translation unit 203 are as described in embodiment 1.

The switch unit 501 includes ports that are connected to the back-end switches 104A and 104b, the processor unit in the same storage controller, and the processor unit in the different storage controller. The switch unit 501 performs switching for communication data between the units connected to the ports and the CPU 201.

Embodiment 3

Figure 8:
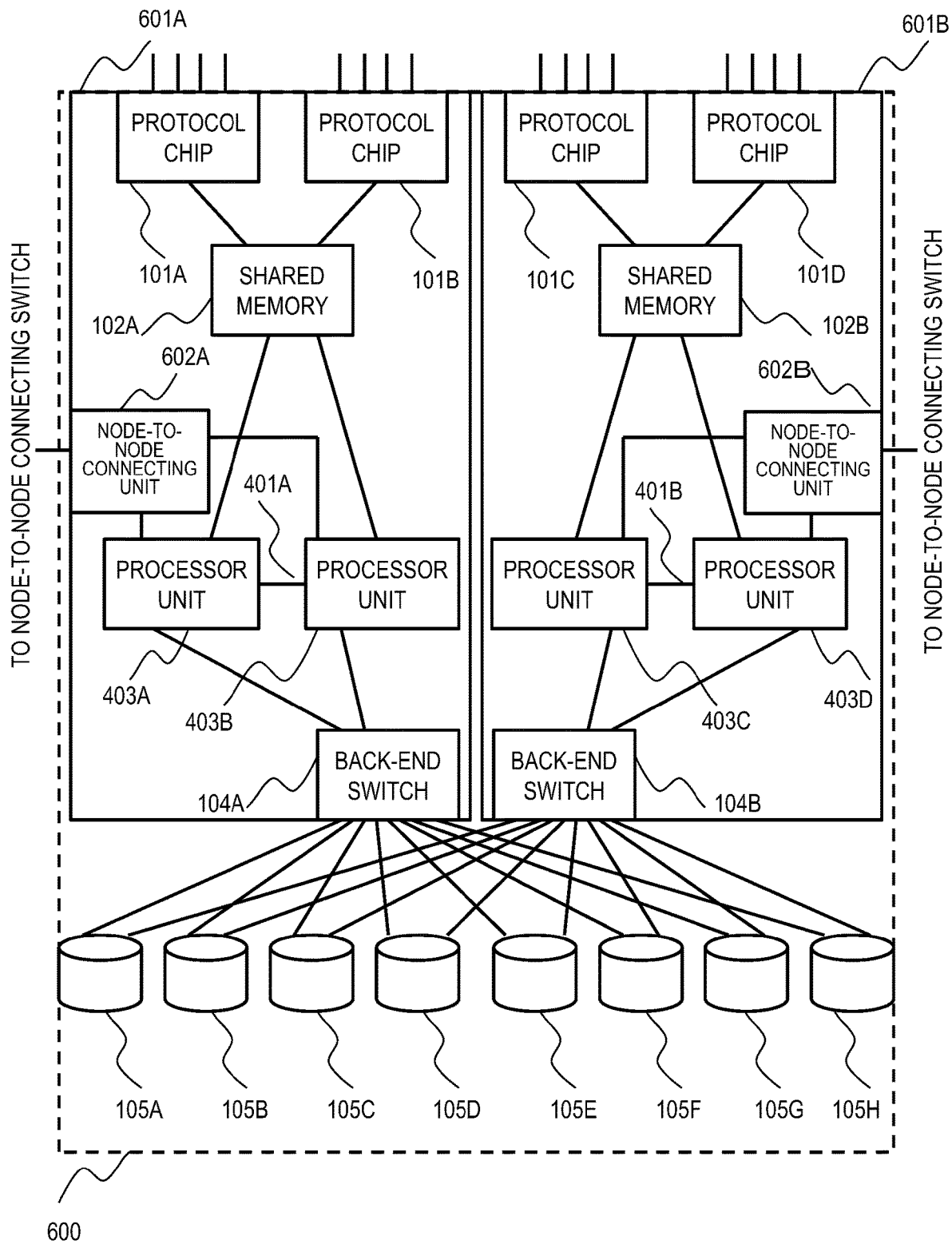
FIG. 8 is an example of a storage node of the storage system in embodiment 3.
Figure 9:
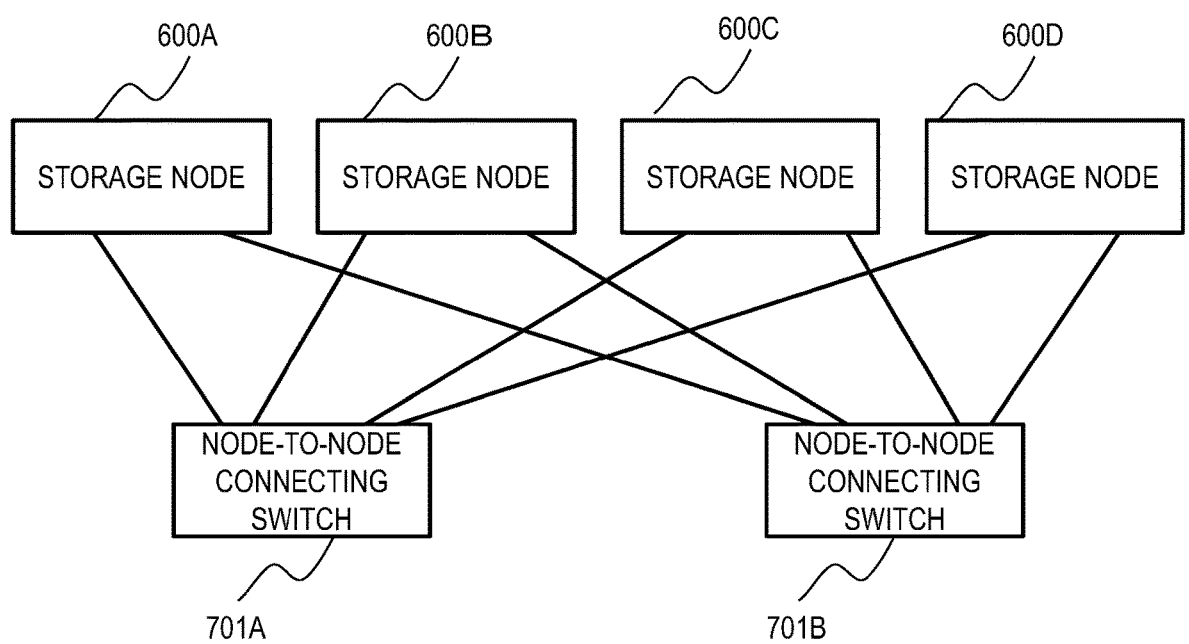
FIG. 9 is an example of an overall configuration of the storage system in embodiment 3.

A description will be given below of a storage system of embodiment 3. In the following description, focus will be placed on differences from embodiment 1. FIG. 8 is an example of a configuration of a storage node in embodiment 3. FIG. 9 is an example of a configuration of the storage system including the plurality of storage nodes. Although FIG. 9 illustrates four storage nodes 600A to 600D, the number of storage nodes included in the storage system is not limited to four.

As illustrated in FIG. 9, each of the storage nodes 600A to 600D is connected to node-to-node connecting switches 701A and 701B. Each storage node can communicate with any other storage node via the node-to-node connecting switch 701A or 701B. The plurality of storage nodes and the controllers included in the respective storage nodes enhance availability of the storage system by taking over each other at the time of a fault. Further, it is possible to achieve increased scale, higher performance, and higher capacity of the overall system by connecting the plurality of storage nodes with the switches 701A and 701B.

The storage node 600 illustrated in FIG. 8 is any one of the storage nodes 600A to 600D. Although the storage nodes 600A to 600D have a common configuration in the present example, they may have different configurations, and the numbers of components of the same type may be different.

The storage node 600 includes two storage controllers 601A and 601B and the eight storage devices 105A to 105H. Each of the storage controllers 601A and 601B processes IO requests from the host apparatus. The host apparatus can access the storage devices 105A to 105H by way of any of the storage controllers 601A and 601B.

The storage controller 601A includes the protocol chips 101A and 101B, the shared memory 102A, the processor units 403A and 403B, a node-to-node connecting unit 602A, and the back-end switch 104A. The storage controller 601B includes the protocol chips 101C and 101D, the shared memory 102B, the processor units 403C and 403D, a node-to-node connecting unit 602B, and the back-end switch 104B.

In the configuration example illustrated in FIG. 8, the storage controllers 601A and 601B have the same numbers of protocol chips, shared memories, processor units, node-to-node connecting units, and back-end switches. This makes it possible for the storage controllers 601A and 601B to exhibit similar performance. It should be noted that the number of components of each type of the storage controllers 601A and 601B is not limited to those illustrated.

Also, the implementation for allowing replacement on a storage-controller-by-storage-controller basis becomes easier, and fault recovery is facilitated by quick replacement of the controller at the time of a fault. Further, capabilities of the respective storage controllers to process IO requests from the host apparatus can be equalized by providing the same numbers of protocol chips, shared memories, processor units, and back-end switches, which eliminates the need to take into consideration a difference in processing performance between storage controllers in the case where distribution of processing among the respective storage controllers is determined and makes it easy to determine the distribution.

The path 401A connects the processor unit 403A and the processor unit 403B and transfers data therebetween. The path 401B connects the processor unit 403C and the processor unit 403D and transfers data therebetween.

As a result, the path that goes through the node-to-node connecting unit 602A or 602B and the node-to-node connecting switch 701A or 701B becomes the only path that connects the storage controller 601A or 601B and other storage controllers, and while the processor units 403A and 403B and the processor units 403C and 403D are not directly connected, path connection is simplified. This makes it possible to simplify the procedure for replacing the storage controllers 601A and 601B.

Also, for example, it becomes possible to monitor the operation of the processor unit 403A or 403B from a different storage controller by connecting the processor unit 403A or 403B to a different storage node through the node-to-node connecting switch 701A or 701B with the node-to-node connecting unit 602A, which makes it possible to detect faults of the processor units 403A and 403B when both of them become faulty.

The shared memory 102A is accessed by the protocol chips 101A and 101B and the processor units 403A and 403B but not by the protocol chips 101C and 101D and the processor units 403C and 403D of the storage controller 601B.

The shared memory 102B is accessed by the protocol chips 101C and 101D and the processor units 403C and 403D but not by the protocol chips 101A and 101B and the processor units 403A and 403B of the storage controller 601A.

The processor units 403A and 403B access the storage devices 105A to 105H via the back-end switch 104A. The processor units 403C and 403D access the storage devices 105A to 105H via the back-end switch 104B.

The node-to-node connecting unit 602A connects the storage controller 601A to the node-to-node connecting switch 701A. The processor units 403A and 403B of the storage controller 601A can communicate with the processor units of another storage node or its own storage node via the node-to-node connecting unit 602A and the node-to-node connecting switch 701A.

The node-to-node connection unit 602B connects the storage controller 601B to the node-to-node connecting switch 701B. The processor units 403C and 403D of the storage controller 601B can communicate with the processor units of another storage node or its own storage node via the node-to-node connecting unit 602B and the node-to-node connecting switch 701B.

When a processor unit starts to reboot, the other processor unit in the same storage controller takes over the IO process thereof. As in embodiment 1, even if a processor unit reboots, the status of the shared memory (data) is maintained, and the shared memory continues to operate. The other processor unit takes over the IO process of the processor unit that has started to reboot, via the shared memory.

As for the processor units of different storage controllers, because they cannot access the shared memory 102A or 102B of the other processor unit, the IO process itself is not taken over.

It should be noted, however, that because the storage controllers 601A and 601B are connected to the node-to-node connecting switch 701A or 701B by the node-to-node connecting units 602A and 602B, respectively, in the example illustrated in FIG. 8, the storage controllers 601A and 601B can communicate data received from the host apparatus through the node-to-node connecting unit 602A or 602B, with the other storage controller. Moreover, by storing the data received through communication with the other storage controller, a risk of loss of the data received from the host apparatus before the data is stored in the storage devices 105A to 105H can be reduced even if the storage controller 601A or 601B becomes faulty. Further, as illustrated in FIG. 9, because the connection paths between the storage nodes 600A and 600B and the node-to-node connecting switches 701A and 701B are simple connection achieved merely by connecting directly, it becomes easy to add or remove the storage nodes.

Embodiment 4

Figure 10:
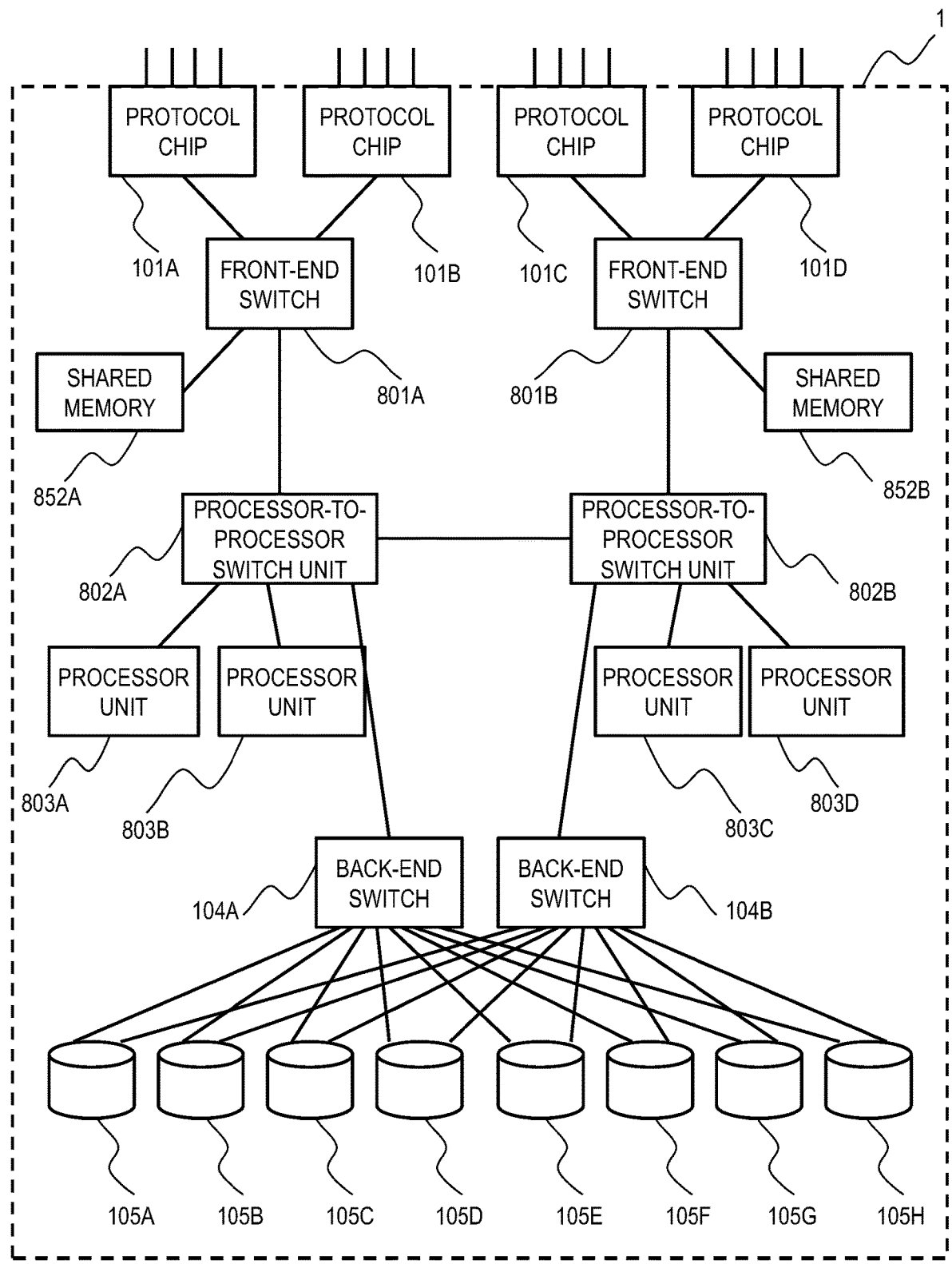
FIG. 10 is an example of the storage system in embodiment 4.

A description will be given below of a storage system of embodiment 4. In the following description, focus will be placed on differences from embodiment 1. FIG. 10 is an example of a configuration of the storage system 1 in embodiment 4. In the present example, the protocol chips, the shared memories, and the processor units are connected by one or a plurality of switch units. This makes it possible to simplify the configuration of the processor units and the shared memory units.

The storage system 1 includes the protocol chips 101A to 101D, shared memories 852A and 852B, processor units 803A to 803D, front-end switches 801A and 801B, processor-to-processor switch units 802A and 802B, the back-end switches 104A and 104B, and the storage devices 105A to 105H. The number of components of each type is not limited to that in the example of FIG. 10.

The front-end switch 801A connects the protocol chips 101A and 101B, the shared memory 852A, and the processor-to-processor switch unit 802A and performs switching for communication data therebetween. The front-end switch 801B connects the protocol chips 101C and 101D, the shared memory 852B, and the processor-to-processor switch unit 802B and performs switching for communication data therebetween.

The processor-to-processor switch unit 802A connects the processor units 803A and 803B, the front-end switch 801A, the processor-to-processor switch unit 802B, and the back-end switch 104A and performs switching for communication data therebetween. The processor-to-processor switch unit 802B connects the processor units 803C and 803D, the front-end switch 801B, the processor-to-processor switch unit 802A, and the back-end switch 104B and performs switching for communication data therebetween.

Figure 11:
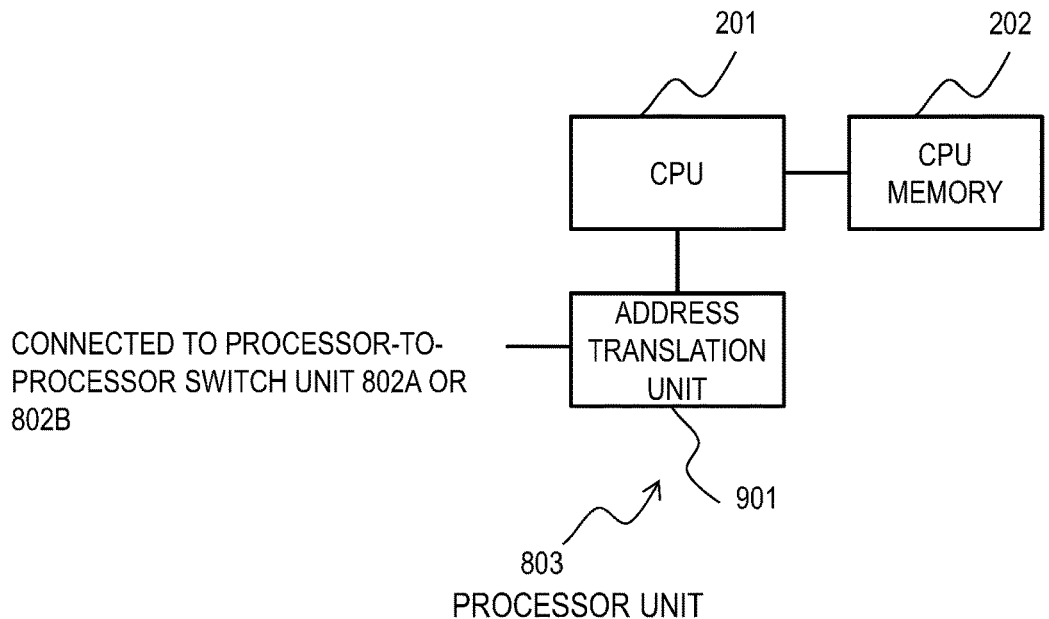
FIG. 11 is an example of a configuration of the processor unit in embodiment 4.

FIG. 11 illustrates a configuration example of the processor unit 803 in embodiment 4. The processor unit 803 represents any one of the four processor units 803A to 803D. In this embodiment, the processor units 803A to 803D have the configuration illustrated in FIG. 11. The processor unit 803 includes the CPU 201, the CPU memory 202, and an address translation unit 901. The CPU 201 and the CPU memory 202 are as described in embodiment 1.

The address translation unit 901 is connected to the processor-to-processor switch unit 802A or the processor-to-processor switch unit 802B. The switch unit 204 of the embodiment 1 is not included in the processor unit 803. The paths are switched by an external switch unit of the processor unit 803 such as the processor-to-processor switch unit 802A or 802B.

Figure 12:
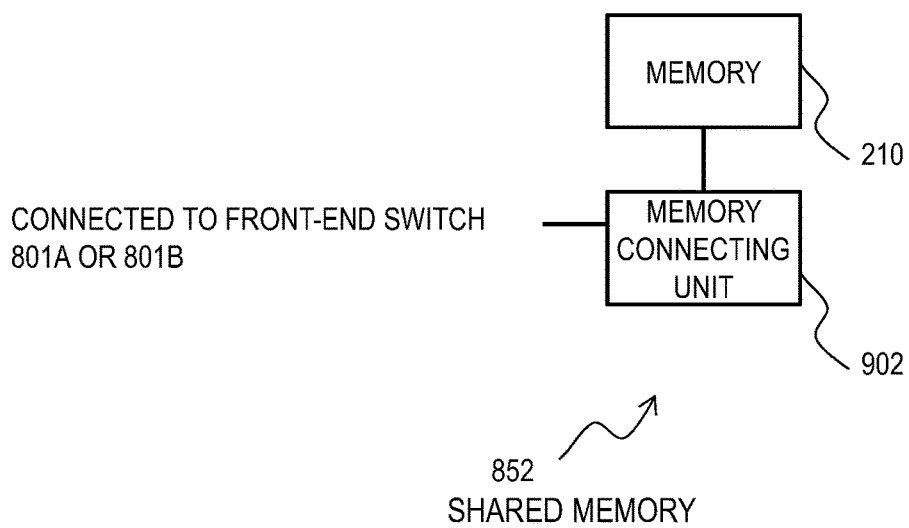
FIG. 12 is an example of a configuration of the shared memory in embodiment 4.

FIG. 12 illustrates a configuration example of the shared memory 852. The shared memory 852 represents any one of the two shared memories 852A and 852B. In this embodiment, the shared memories 852A and 852B have the configuration illustrated in FIG. 12.

The shared memory 852 includes a memory connecting unit 902 instead of the memory switch unit 211 of the shared memory 102 illustrated in FIG. 4. The memory connecting unit 902 connects the memory 210 and the front-end switch 801A or 801B.

Embodiment 5

Figure 13:
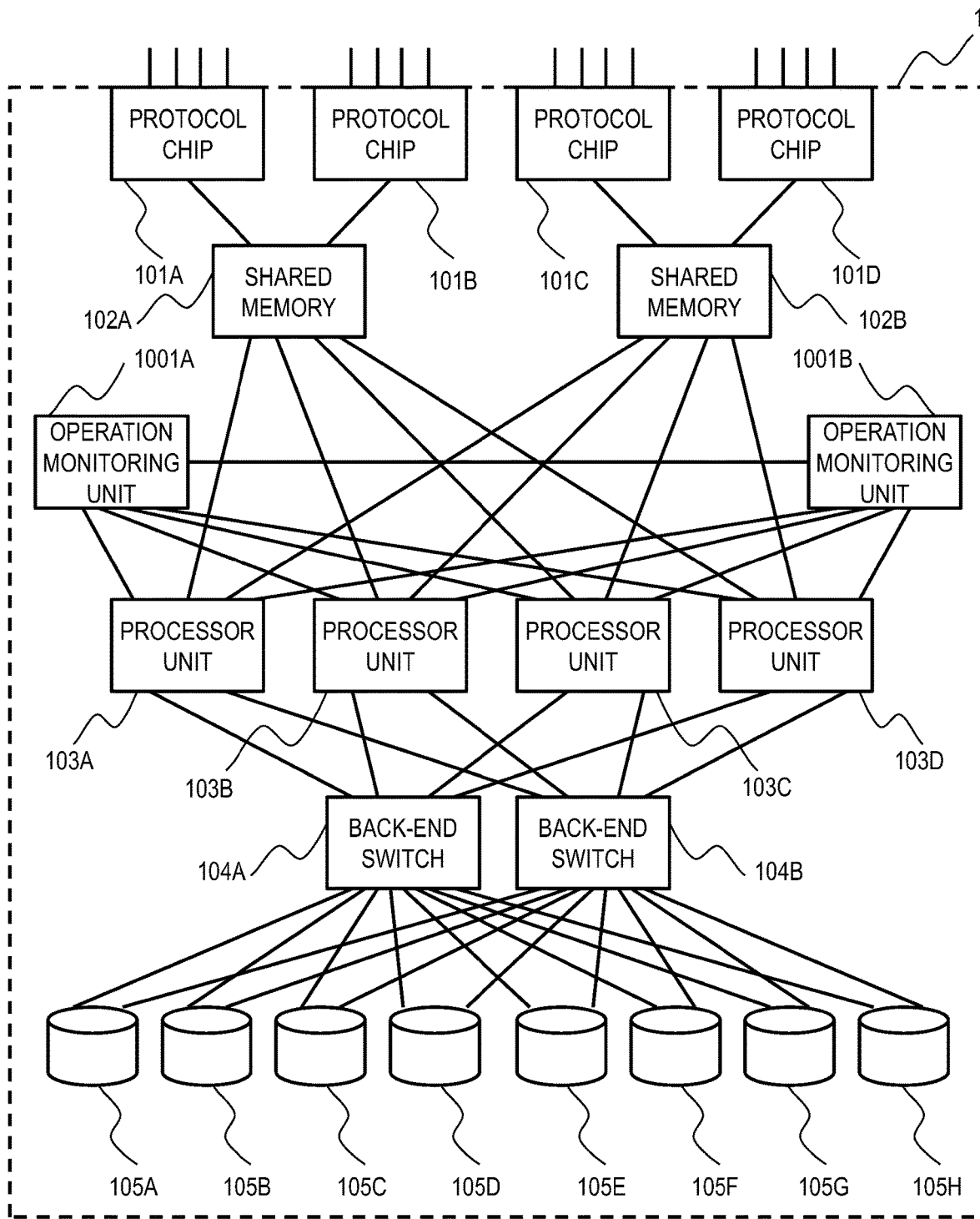
FIG. 13 is an example of a configuration of the storage system in embodiment 5.

A description will be given below of a storage system of embodiment 5. In the following description, focus will be placed on differences from embodiment 1. FIG. 13 is an example of a configuration of the storage system 1 in embodiment 5. In the present example, operation monitoring units independent of the processor units monitor the operation of the processor units and detect a reboot thereof. The operation monitoring unit determines which one of the other processor units takes over the process of the processor unit that has started to reboot. This makes it possible to reduce a load on the processor units.

In the configuration example illustrated in FIG. 13, the storage system 1 includes operation monitoring units 1001A and 1001B in addition to the configuration example illustrated in FIG. 1. Each of the operation monitoring units 1001A and 1001B is connected to the processor units 103A to 103D and can communicate therewith. The operation monitoring units 1001A and 1001B monitor the operation of the processor units 103A to 103D and detect a reboot thereof by receiving, from the processor units 103A to 103D, a signal indicating whether or not the processor units 103A to 103D reboot or a heartbeat signal indicating that the processor units 103A to 103D are operating normally without any reboot. Even if one of the operation monitoring units 1001A and 1001B stops operating due to a fault or the like, providing the two operation monitoring units 1001A and 1001B makes it possible for the remaining one of the operation monitoring units 1001A or 1001B to continue to monitor the operation of the processor units 103A to 103D.

Figure 14:
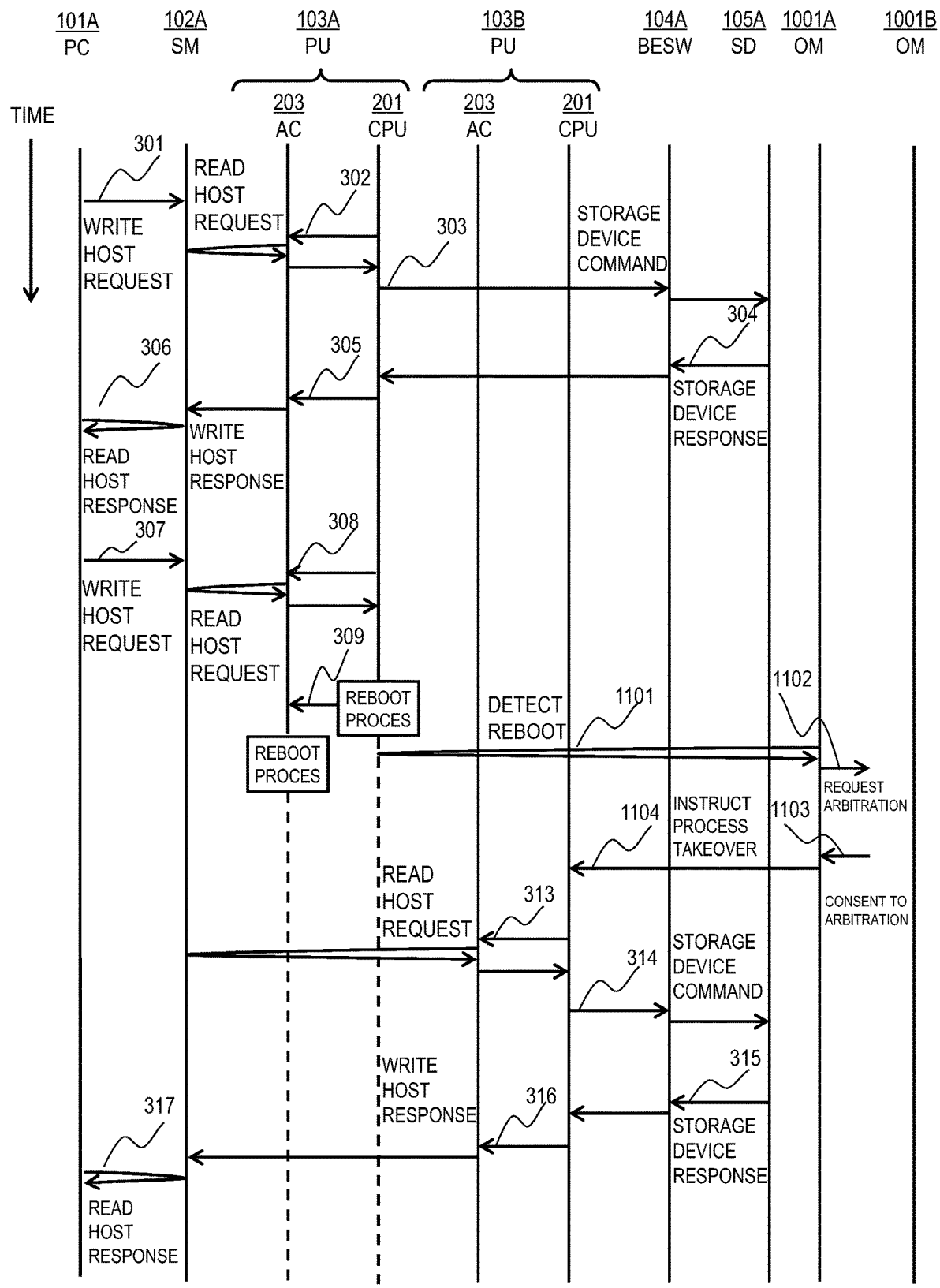
FIG. 14 is an example of a processing sequence for taking over a request and a response from the host apparatus in embodiment 5.

FIG. 14 is a sequence diagram of an operation example of the storage system 1 of the present embodiment. In the operation example of FIG. 14, steps 301 to 309 are similar to steps 301 to 309 in the sequence diagram of FIG. 5.

In the example illustrated in FIG. 14, when the processor unit 103A starts a reboot process 309, the operation monitoring unit 1001A detects the reboot of the processor unit 103A (1101). The operation monitoring unit 1001A determines which processor unit takes over the IO process of the processor unit 103A and specifies the processor unit that takes over the IO process and requests arbitration to the operation monitoring unit 1001B which is another operation monitoring unit (1102). Here, as an example, the processor unit 103B is selected.

When an acknowledgement of the arbitration is received from the operation monitoring unit 1001B (1103), the operation monitoring unit 1001A instructs the CPU 201 of the processor unit 103B to take over the IO process of the processor unit 103A (1104). The CPU 201 of the processor unit 103B that has received the instruction takes over the IO process that has been executed by the processor unit 103A in the beginning and executes the IO process as described with reference to FIGS. 5 (313 to 316). Steps 313 to 316 are as described with reference to FIG. 5. Thereafter, as in the description given with reference to FIG. 5, the protocol chip 101A reads the host response from the shared memory 102A and transfers the response to the host apparatus (317).

It should be noted that the present disclosure is not limited to the above embodiments and includes various modification examples. For example, the above embodiments have been described in detail to describe the present disclosure in an easy-to-understand manner and are not necessarily limited to those that include all the components described above. Also, some of the components of one embodiment can be replaced by components of another embodiment, and components of another embodiment can be added to components of one embodiment. Also, it is possible to add other components to some components of each of the embodiments and remove or replace some components thereof.

Also, some or all of the above respective components, functions, processing units, and the like may be realized by hardware by designing them with integrated circuits (ICs). Also, each of the above respective components, functions, and the like may be realized by software by the processor interpreting and executing programs for realizing the respective functions. Such information as the programs for realizing the respective functions, tables, and files can be stored on a memory, a recording apparatus such as a hard disk or SSD, or a recording medium such as IC card or secured digital (SD) card.

Also, control lines and information lines that are illustrated are those that are considered necessary for description, and not all the control lines and information lines on the product are necessarily illustrated. In practice, it may be considered that almost all components are connected to each other.

What is claimed is:

1. A storage system for processing a request from a host apparatus, the storage system comprising:
   a first protocol chip configured to control a protocol used for communication with the host apparatus;
   a plurality of processors configured to control the storage system;
   a first shared memory that can be read and written by the first protocol chip and the plurality of processors; and
   a plurality of address translation units each of which connects a corresponding processor of the plurality of processors and the first shared memory, wherein
   the address translation units translate addresses used by the respective corresponding processors of the plurality of processors into addresses used to read from or write to the first shared memory,
   the first protocol chip writes the request from the host apparatus to the first shared memory,
   a first processor among the plurality of processors reads the request from the host apparatus written to the first shared memory by the first protocol chip from the first shared memory through a first address translation unit among the plurality of address translation units that is connected to the first processor and writes a response to the request to the first shared memory through the first address translation unit,
   the first protocol chip reads the response to the request from the host apparatus written by the first processor from the first shared memory and sends the response to the host apparatus,
   the first processor among the plurality of processors is configured to perform a reboot process that includes a reboot of the first address translation unit connected to the first processor, and
   while the first processor is performing the reboot process, a second processor that is different from the first processor of the plurality of processors is configured to substitute for the first processor by reading a first request addressed to the first processor from the host apparatus written by the first protocol chip from the first shared memory through a second address translation unit connected to the second processor, and writing a first response to the first request to the first shared memory through the second address translation unit.

2. The storage system of claim 1, wherein
   the first processor performs the reboot process of the first address translation unit by transmitting a reset signal to the first address translation unit.

3. The storage system of claim 1, further comprising:
   a first storage controller and a second storage controller, wherein
   the first storage controller includes the first protocol chip, the first shared memory, the first processor, the second processor, the first address translation unit, and the second address translation unit; and
   the second storage controller includes a second protocol chip configured to control a protocol used for communication with the host apparatus, a third plurality of processors, a second shared memory that can be read and written by the second protocol chip and the third plurality of processors, and a third plurality of address translation units each of which connects a corresponding processor of the third plurality of processors and the second shared memory, wherein the third plurality of address translation units translate addresses used by the respective corresponding processors of the third plurality of processors into addresses used to read from or write to the second shared memory.

4. The storage system of claim 3, further comprising:

a plurality of storage nodes capable of communicating with each other, wherein each of the plurality of storage nodes includes the first storage controller and the second storage controller.

5. The storage system of claim 1, wherein the first protocol chip, the first shared memory, and the plurality of address translation units are connected via one or a plurality of switch units.

6. The storage system of claim 1, wherein the plurality of processors collectively configured to monitor whether another processor reboots, the second processor detects a reboot of the first processor, and the second processor notifies all the processors other than the first processor and the second processor that the second processor will substitute for the first processor.

7. The storage system of claim 1, further comprising:

a plurality of operation monitoring units, wherein the plurality of operation monitoring units are collectively configured to monitor a reboot of the plurality of processors, upon detection of a reboot of a particular processor among the plurality of processors, one of the plurality of operation monitoring units determines, from among other processors that have not rebooted, a respective processor that will read the request from the host apparatus substituting for the particular processor that has rebooted, requests arbitration to all the other operation monitoring units of the plurality of operation monitoring units for determination of the respective processor that will read the request from the host apparatus from the first shared memory substituting for the particular processor that has rebooted, receives acknowledgement of the request for the arbitration for the determination of the respective processor that will read the request from the host apparatus from the first shared memory substituting for the particular processor that has rebooted from all the other operation monitoring units of the plurality of operation monitoring units, and instructs the respective processor to read the request from the host apparatus from the first shared memory substituting for the particular processor that has rebooted.

8. The storage system of claim 1, wherein the first shared memory includes a request area for storing a request from the host apparatus and a response area for storing a response to the request for each combination of the first protocol chip and one of the plurality of processors, the first protocol chip writes the request from the host apparatus to the request area of the corresponding processor, each of the plurality of processors reads the request from the request area corresponding to each processor, each of the plurality of processors writes a response to the request to the response area corresponding to each processor, the first protocol chip reads the response from the response area, and, while the first processor performs the reboot, the second processor is further configured to read the first request addressed to the first processor from the request area corresponding to the first processor, and write the first response to the first request to the response area corresponding to the first processor.

* * * * *